US012673694B2

(12) United States Patent
Ohsugi

(10) Patent No.: US 12,673,694 B2
(45) Date of Patent: Jul. 7, 2026

(54) AUTOMATED DRIVING SYSTEM AND CONTROL METHOD FOR AUTOMATED DRIVING SYSTEM

(71) Applicant: TOYOTA JIDOSHA KABUSHIKI KAISHA, Toyota (JP)

(72) Inventor: Masamichi Ohsugi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/813,907

(22) Filed: Aug. 23, 2024

(65) Prior Publication Data

US 2025/0074458 A1 Mar. 6, 2025

(30) Foreign Application Priority Data

Sep. 5, 2023 (JP) ................................. 2023-143468

(51) Int. Cl.
*B60W 60/00* (2020.01)
*B60W 50/14* (2020.01)

(52) U.S. Cl.
CPC .......... *B60W 60/001* (2020.02); *B60W 50/14* (2013.01); *B60W 2554/4041* (2020.02); *B60W 2556/10* (2020.02)

(58) Field of Classification Search
CPC ............... B60W 60/001; B60W 50/14; B60W 2554/4041; B60W 2556/10
See application file for complete search history.

(56) References Cited

U.S. PATENT DOCUMENTS

| | | | |
|---|---|---|---|
| 2020/0027351 A1 | 1/2020 | Gotoda et al. | |
| 2020/0079379 A1 | 3/2020 | Mimura | |
| 2021/0237759 A1* | 8/2021 | Wray | ................. B60W 60/0011 |
| 2022/0315041 A1* | 10/2022 | Hayes | .................... G06N 20/00 |
| 2023/0234599 A1* | 7/2023 | Tsuda | .................... B60W 50/04 |
| | | | 701/23 |
| 2023/0264707 A1 | 8/2023 | Iwaki | |

FOREIGN PATENT DOCUMENTS

| | | |
|---|---|---|
| JP | 2016-038838 A | 3/2016 |
| JP | 2017-166913 A | 9/2017 |
| JP | 2019-010931 A | 1/2019 |
| JP | 2019-055746 A | 4/2019 |
| JP | 2020-042612 A | 3/2020 |

* cited by examiner

*Primary Examiner* — Adnan M Mirza

(74) *Attorney, Agent, or Firm* — Dinsmore & Shohl LLP

(57) ABSTRACT

An automated driving system for deciding to change a travel state of a host vehicle using a machine learning model in an automated driving control process for the host vehicle includes an automated driving control unit configured to decide to change the travel state of the host vehicle using the machine learning model on the basis of a preset target route and position information of the host vehicle and map information, or a detection result of an external sensor of the host vehicle, and an information presentation unit configured to present a travel state change factor, which is a main cause of the change in the travel state, and the change in the travel state of the host vehicle to a user of the host vehicle when the automated driving control unit decides to change the travel state of the host vehicle.

6 Claims, 6 Drawing Sheets

AUTOMATED DRIVING SYSTEM AND CONTROL METHOD FOR AUTOMATED DRIVING SYSTEM

CROSS-REFERENCE TO RELATED APPLICATIONS

This application is based upon and claims the benefit of priority from Japanese Patent Application No. 2023-143468, filed on Sep. 5, 2023, the entire contents of which are incorporated herein by reference.

TECHNICAL FIELD

The present disclosure relates to an automated driving system and a control method for the automated driving system.

BACKGROUND

Conventionally, Japanese Unexamined Patent Publication No. 2017-166913 is known as technical literature related to an automated driving system. As shown in Japanese Unexamined Patent Publication No. 2017-166913, a vehicle including an automated driving function provides a notification to a driver by generating overhead view display to be shown on a display screen provided in the vehicle cabin and displaying a scheduled trajectory line indicating the future behavior of the host vehicle when a lane change event occurs.

SUMMARY

A process in which the automated driving system controls the travel of a vehicle using a machine learning model is being studied. However, it is difficult for the machine learning model to continuously make appropriate determinations in all travel scenarios. Thus, it is necessary for users to appropriately ascertain information about the reasons for the decisions of the machine learning model.

According to an aspect of the present disclosure, there is provided an automated driving system for deciding to change a travel state of a host vehicle using a machine learning model in an automated driving control process for the host vehicle, the automated driving system including: an automated driving control unit configured to decide to change the travel state of the host vehicle using the machine learning model on the basis of a preset target route and position information of the host vehicle and map information, or a detection result of an external sensor of the host vehicle, position information of the host vehicle, map information, and a detection result of an external sensor of the host vehicle; and an information presentation unit configured to present a travel state change factor, which is a main cause of the change in the travel state, and the change in the travel state of the host vehicle to a user of the host vehicle when the automated driving control unit decides to change the travel state of the host vehicle.

The automated driving system according to the aspect of the present disclosure can present the travel state change factor and the change in the travel state to the user at the time of a decision to change the travel state of the automated driving control process based on the machine learning model.

In the automated driving system according to the aspect of the present disclosure, the travel state change factor may include proximity of another vehicle, which is traveling in front of the host vehicle and in an adjacent lane, to a host-vehicle lane side on which the host vehicle is traveling and the change in the travel state may include changing a travel position within a host-vehicle lane of the host vehicle to a position away from the adjacent lane.

In the automated driving system according to the aspect of the present disclosure, the information presentation unit may be configured to adjust an amount of information to be presented to the user on the basis of a usage history of the automated driving control process for the host vehicle.

The automated driving system according to the aspect of the present disclosure may further include a feedback reception unit configured to receive feedback from the user corresponding to the presentation of the travel state change factor and the change in the travel state of the host vehicle by the information presentation unit for the user, wherein the automated driving control unit is configured to adjust at least one of a timing of the change in the travel state of the host vehicle and an amount of control of the change in the travel state of the host vehicle on the basis of a result of the feedback.

According to another aspect of the present disclosure, there is provided a control method for an automated driving system for deciding to change a travel state of a host vehicle using a machine learning model in an automated driving control process for the host vehicle, the control method including: deciding to change the travel state of the host vehicle using the machine learning model on the basis of a preset target route and position information of the host vehicle and map information, or a detection result of an external sensor of the host vehicle; and presenting a travel state change factor, which is a main cause of the change in the travel state, and the change in the travel state of the host vehicle to a user of the host vehicle before the change in the travel state when the change in the travel state of the host vehicle is decided.

According to the control method for the automated driving system according to another aspect of the present disclosure, when the change in the travel state of the automated driving control process based on the machine learning model is decided, the travel state change factor and the change in the travel state can be presented to the user.

According to each aspect of the present disclosure, when the change in the travel state of the automated driving control process based on the machine learning model is decided, the travel state change factor and the change in the travel state can be presented to the user.

DETAILED DESCRIPTION

Hereinafter, embodiments of the present disclosure will be described with reference to the drawings.

Figure 1:
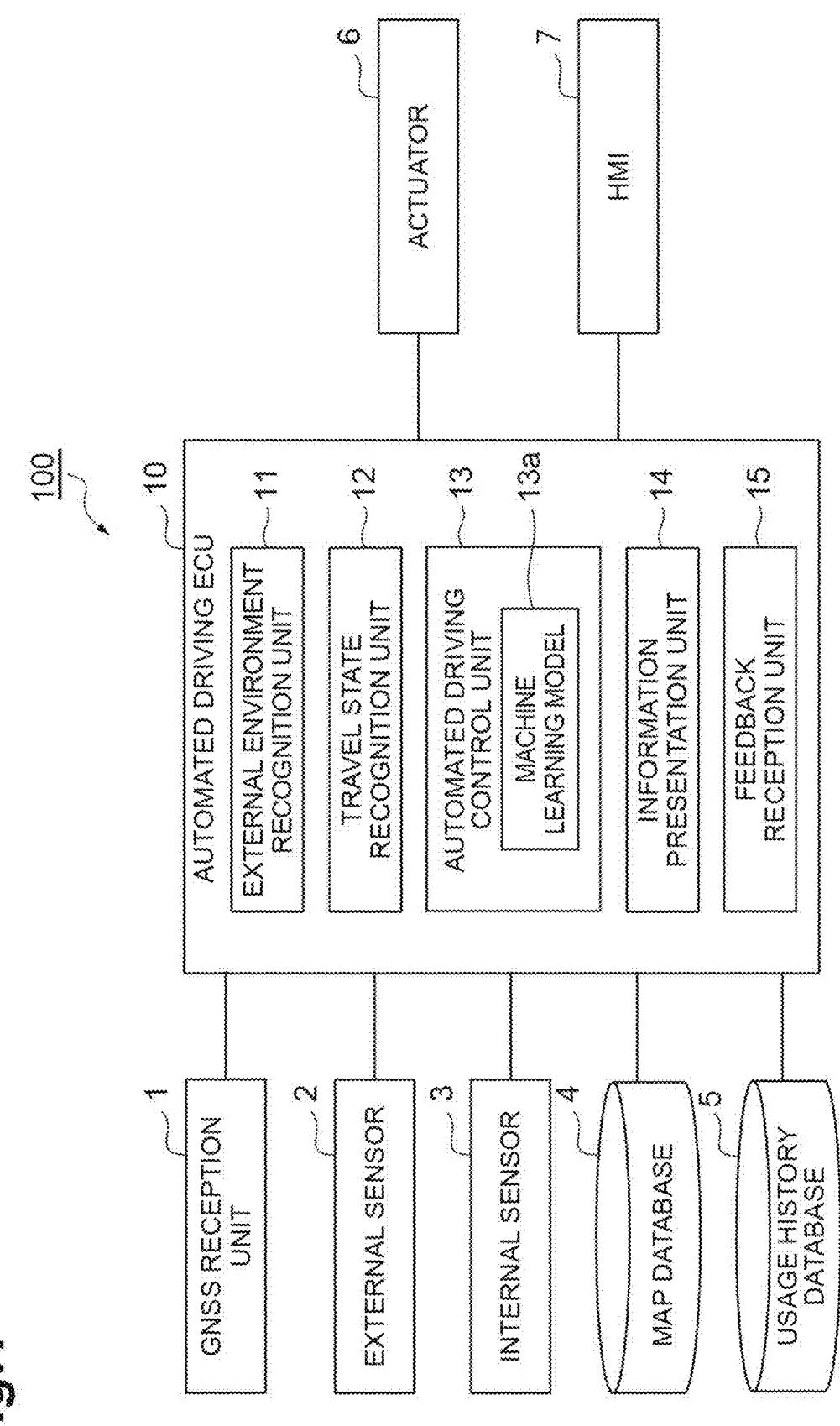
FIG. 1 is a block diagram showing an automated driving system according to an embodiment.

FIG. 1 is a block diagram showing an automated driving system 100 according to an embodiment. The automated driving system 100 shown in FIG. 1 is mounted in a vehicle such as a passenger vehicle or a freight vehicle and executes an automated driving control process for the vehicle. Hereinafter, the vehicle in which the automated driving system 100 is mounted is referred to as a host vehicle. Also, some functions of the automated driving system 100 may be executed on a server capable of communicating with the host vehicle.

The automated driving control process is a vehicle control process in which a driver does not perform a driving manipulation and the host vehicle is allowed to automatically travel along a road without the host vehicle being driven by the driver. The automated driving system 100 starts the automated driving control process for the host vehicle when a user such as the driver of the host vehicle performs a start manipulation for the automated driving control process. The start manipulation for the automated driving control process by the user is, for example, a manipulation of pressing a start button for the automated driving control process or the like. In addition, the host vehicle may be a fully automated driving vehicle that does not require a driver. In this case, the user is an occupant of the host vehicle.

In the automated driving system 100, each automated driving control step is performed using the machine learning model. In the automated driving system 100, the machine learning model is used for at least one of the recognition of an external environment, the generation of a travel plan for the automated driving control process, and the generation of an instruction for the automated driving control process. The generation of the travel plan includes the generation of a scheduled trajectory along which the host vehicle will travel. Details of the machine learning model will be described below. The automated driving system 100 presents information about a change in the travel state of the host vehicle decided by the machine learning model to the user.

Configuration of Automated Driving System

Hereinafter, a configuration of the automated driving system 100 according to the present embodiment will be described with reference to FIG. 1. As shown in FIG. 1, the automated driving system 100 includes an automated driving electronic control unit (ECU) 10 that generally manages the devices.

The automated driving ECU 10 is an electronic control unit having a central processing unit (CPU) and a storage unit. The storage unit includes, for example, a read-only memory (ROM), a random-access memory (RAM), an electrically erasable programmable read-only memory (EEPROM), and the like. In the automated driving ECU 10, for example, various functions are implemented when the CPU executes a program stored in the storage unit. The automated driving ECU 10 may include a plurality of electronic units.

The automated driving ECU 10 is connected to a GNSS reception unit 1, an external sensor 2, an internal sensor 3, a map database 4, a usage history database 5, an actuator 6, and a human-machine interface (HMI) 7.

The GNSS reception unit 1 measures a position of the host vehicle (for example, the latitude and longitude of the host vehicle) by receiving a signal from a positioning satellite. The GNSS reception unit 1 transmits information about the measured position of the host vehicle to the automated driving ECU 10.

The external sensor 2 is detection equipment configured to detect a surrounding situation of the host vehicle. The external sensor 2 includes at least one of a camera and a radar sensor. A camera is imaging equipment configured to image an external situation of the host vehicle. For example, the camera is provided on a back side of a windshield of the host vehicle and images a forward direction of the host vehicle. The camera transmits an image obtained by imaging the external situation of the host vehicle to the automated driving ECU 10. The radar sensor is detection equipment configured to detect a physical object near the host vehicle using radio waves (for example, millimeter waves) or light. The radar sensor includes, for example, a millimeter-wave radar or a light detection and ranging (LIDAR) sensor. The radar sensor transmits information of the detected physical object to the automated driving ECU 10.

The internal sensor 3 is detection equipment configured to detect a travel state of the host vehicle. The internal sensor 3 includes a vehicle speed sensor and a yaw rate sensor. The vehicle speed sensor is a detector configured to detect a speed of the host vehicle. The vehicle speed sensor transmits detected vehicle speed information (vehicle-wheel speed information) to the automated driving ECU 10.

The yaw rate sensor is a detector configured to detect a yaw rate (rotational angular velocity) about a vertical axis of a center of gravity of the host vehicle. As the yaw rate sensor, for example, a gyro sensor can be used. The yaw rate sensor transmits information about the detected yaw rate of the host vehicle to the automated driving ECU 10. The internal sensor 3 may include an acceleration sensor.

The map database 4 is a database configured to store map information. The map database 4, for example, is formed in a storage device such as a hard disk drive (HDD) mounted in the host vehicle. The map information includes road position information, road shape information (for example, curves, straight line types, curve curvatures, and the like), position information of intersections and branch points, and position information of structures. In addition, the map database 4 may be formed on a server capable of communicating with the host vehicle. Moreover, it is not necessary to necessarily use map information in the automated driving control process.

The usage history database 5 is a database in which a usage history of the automated driving control process for the host vehicle is recorded. In the usage history database 5, a time period during which the automated driving control process for the host vehicle was executed is recorded. In the usage history database 5, when the host vehicle is equipped with a user's personal authentication function, the usage history of the automated driving control process may be recorded separately for each user.

The actuator 6 is equipment used to control the host vehicle. The actuator 6 includes at least a drive actuator, a brake actuator, and a steering actuator. The drive actuator controls an amount of air supplied to an engine (a degree of throttle opening) in accordance with a control signal from the automated driving ECU 10 and controls a driving force of the host vehicle. In addition, when the host vehicle is a hybrid vehicle (HEV: hybrid electric vehicle), a control signal from the automated driving ECU 10 is input to a motor serving as a motive power source to control the driving force in addition to the amount of air supplied to the engine. When the host vehicle is an electric vehicle (BEV: battery electric vehicle), a control signal from the automated driving ECU 10 is input to the motor serving as the motive power source and the driving force is controlled. The motor serving as the motive power source in these cases constitutes the actuator 6.

The brake actuator controls the brake system in accordance with a control signal from the automated driving ECU 10 and controls the braking force applied to the wheels of the host vehicle. As the brake system, for example, a hydraulic brake system can be used. The steering actuator controls the drive of an assist motor that controls steering torque in an electric power steering system in accordance with a control signal from the automated driving ECU 10. Thereby, the steering actuator controls the steering torque of the host vehicle.

The HMI 7 is an interface for inputting and outputting information between the driver or occupant and the automated driving ECU 10. The HMI 7 includes, for example, a display, a speaker, and the like provided in the vehicle cabin. The HMI 7 performs an image output of the display and an audio output from the speaker in accordance with a control signal from the automated driving ECU 10. The display may function as a touch panel. The display may be a center display, a navigation display, or a head-up display (HUD). The HUD presents information to the user by projecting an image onto the windshield of the host vehicle.

Next, a functional configuration of the automated driving ECU 10 will be described. The automated driving ECU 10 includes an external environment recognition unit 11, a travel state recognition unit 12, an automated driving control unit 13, an information presentation unit 14, and a feedback reception unit 15.

The external environment recognition unit 11 recognizes an external environment of the host vehicle on the basis of a detection result of the external sensor 2. A relative position of a physical object near the host vehicle may be included in the external environment. A relative speed and a movement direction of the physical object near the host vehicle may be included in the external environment. Information about a type of physical object such as another vehicle, pedestrian, or bicycle may be included in the external environment. In addition, the external environment recognition unit 11 may recognize the external environment of the host vehicle from a detection result of the external sensor 2 using the machine learning model.

The travel state recognition unit 12 recognizes the travel state of the host vehicle on the basis of a detection result of the internal sensor 3. The travel state includes the speed of the host vehicle, the acceleration of the host vehicle, and the yaw rate of the host vehicle. Specifically, the travel state recognition unit 12 recognizes the speed of the host vehicle on the basis of vehicle speed information of the vehicle speed sensor. The travel state recognition unit 12 recognizes the acceleration of the host vehicle on the basis of acceleration information of the acceleration sensor. The travel state recognition unit 12 recognizes a direction of the host vehicle on the basis of the yaw rate information of the yaw rate sensor.

The automated driving control unit 13 executes the automated driving control process for the host vehicle on the basis of the external environment (surrounding environment) recognized by the external environment recognition unit 11 and the travel state of the host vehicle recognized by the travel state recognition unit 12. The automated driving control unit 13 may further perform an automated driving control process using the position information of the host vehicle measured by the GNSS reception unit 1 and the map information of the map database 4.

The automated driving control unit 13 performs the automated driving control process for the host vehicle using a machine learning model 13a. The machine learning model 13a is a neural network, such as, for example, a convolutional neural network (CNN). The neural network can include a plurality of layers, such as a plurality of convolutional layers and a plurality of pooling layers. As the neural network, a deep learning network such as deep learning is used. In the machine learning model 13a, a recurrent neural network (RNN) can be used.

The automated driving control unit 13 sets a target route for the automated driving control process on the basis of, for example, a destination set by the user, the position information of the host vehicle, and the map information. The target route is a route along which the host vehicle will travel according to the automated driving control process. In addition, the destination may be a point automatically proposed by the automated driving system 100. Moreover, the target route may be set in advance in a well-known navigation system and may be acquired by the automated driving system 100 from the navigation system.

The automated driving control unit 13 generates a travel plan for the automated driving control process on the basis of the target route, the position information of the host vehicle, and the map information. The travel plan includes a vehicle speed plan of the host vehicle and a path plan of the host vehicle. The vehicle speed plan is, for example, data in which the target vehicle speed in the automated driving control process is associated with a set vertical position set at a predetermined interval (for example, 1 m) on the target route. In addition, the set vertical position may be set on the basis of a travel time of the host vehicle instead of the distance. The path plan is data related to a path on a target route. The path is a scheduled trajectory of the vehicle during the automated driving control process on the target route. The path plan can be, for example, data of a steering angle or horizontal position of the host vehicle corresponding to the set longitudinal position on the target route.

The automated driving control unit 13 generates a travel plan using, for example, the machine learning model 13a. The automated driving control unit 13 causes a travel plan to be output from the machine learning model 13a by inputting the target route, the position information of the host vehicle, and the map information. In this case, the machine learning model 13a can be a neural network in which learning is performed to output a travel plan from the target route, the position information of the host vehicle, and the map information. The automated driving control unit 13 may further input the current external environment and travel state to the machine learning model 13a and re-output (revise) the travel plan. In this case, the machine learning model 13a is a neural network in which learning has been performed to output a travel plan using the target route, the position information of the host vehicle, the map information, the external environment, and the travel state as inputs. In the machine learning model 13a, a previously output travel plan may be given as an input.

The automated driving control unit 13 changes the travel state of the host vehicle to execute the automated driving control process by transmitting a control signal to the actuator 6 on the basis of current position information and a travel plan of the host vehicle. In addition, the automated driving control unit 13 may generate a control signal from the machine learning model 13a to the actuator 6 using the current position information and the travel plan of the host vehicle as inputs. In this case, the machine learning model 13a is a neural network in which learning has been performed to generate a control signal for the actuator 6 using the current position information and the travel plan of the host vehicle as inputs.

The automated driving control unit 13 decides to change the travel state of the host vehicle as the automated driving control process by correcting the travel plan based on the current external environment or generating the control signal for the actuator 6. For example, the change in the travel state is a change in the vehicle speed of the host vehicle, a change in the path of the host vehicle, or the like. The change in the path of the host vehicle includes changing a travel position within a host-vehicle lane of the host vehicle to a position away from an adjacent lane. Specific examples will be described later. After a decision to change the travel state of the host vehicle, the automated driving control unit 13 changes the travel state of the host vehicle as the automated driving control process by transmitting the control signal to the actuator 6.

The information presentation unit 14 presents information about the change in the travel state of the host vehicle in the automated driving control to the user. When the decision to change the travel state of the host vehicle is made by the automated driving control unit 13, the information presentation unit 14 presents a travel state change factor, which is a main cause of the change in the travel state, and the change in the travel state of the host vehicle to the user. The travel state change factor is the main cause by which the machine learning model 13a decides to change the travel state of the host vehicle in the automated driving control process.

After the automated driving control unit 13 decides to change the travel state of the host vehicle, the information presentation unit 14 presents information to the user before the change in the travel state of the host vehicle is executed. In addition, the information presentation unit 14 may present information after the change in the travel state of the host vehicle is executed. Moreover, the user can switch the presentation of information between ON and OFF.

Figure 2:
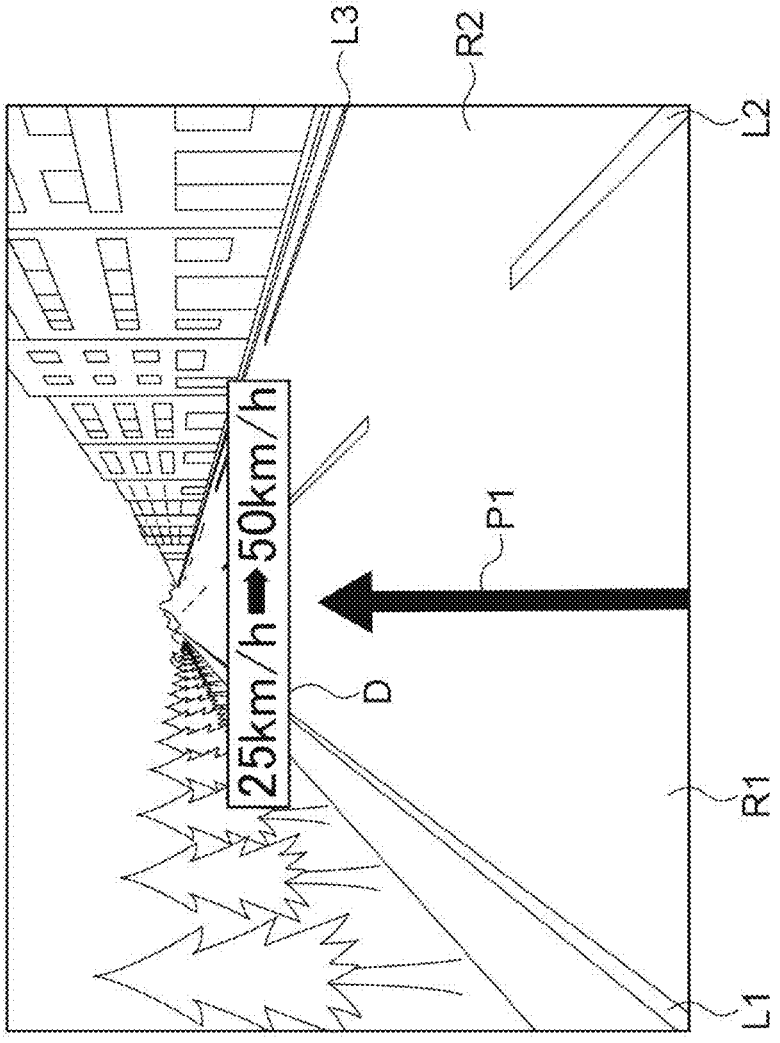
FIG. 2 is a diagram showing an example of information presentation when a decision is made to accelerate a host vehicle.

Here, FIG. 2 is a diagram showing an example of information presentation when a decision to accelerate the host vehicle is made. In FIG. 2, a host-vehicle lane R1 in which the host vehicle is traveling, a white line L1 on the left side of the host-vehicle lane R1, a white line L2 on the right side of the host-vehicle lane R1, an adjacent lane R2, and a white line L3 on the right side of the adjacent lane R2 are shown. The white line L2 is a boundary line between the host-vehicle lane R1 and the adjacent lane R2. Moreover, in FIG. 2, an arrow P1 indicating that there is no preceding vehicle and a space in front of the host vehicle is empty is shown as the travel state change factor, and speed change display D as a change in the travel state of the host vehicle (acceleration of the host vehicle) are shown. In the speed change display D, text indicates that the vehicle speed of the host vehicle accelerates from 25 km/h to 50 km/h. In addition, the speed change display D does not need to be text and may be expressed as meter display or an image.

For example, when a decision to accelerate the host vehicle is made as a decision to change the travel state of the host vehicle, the information presentation unit 14 presents the travel state change factor and the change in the travel state of the host vehicle to the user by displaying the arrow P1 and the speed change display D as images as shown in FIG. 2. As an example, the information presentation unit 14 displays scenery in front of the host vehicle imaged by the camera of the external sensor of the host vehicle on the display of the HMI 7, and then displays the arrow P1 and the speed change display D as the images. Thereby, the user can ascertain the reason for the change in the travel state in the automated driving control process decided using the machine learning model 13a.

In addition, the information presentation unit 14 may present the travel state change factor and the change in the travel state of the host vehicle to the user by projecting the arrow P1 and the speed change display D onto the windshield of the host vehicle with the HUD of the HMI 7 to display the arrow P1 and the speed change display D.

Moreover, the information presentation unit 14 does not necessarily need to project the scenery in front of the host vehicle onto the display. The information presentation unit 14 may present the travel state change factor and the change in the travel state of the host vehicle to the user by displaying only the arrow P1 and the speed change display D without projecting the scenery in front of the host vehicle onto the display. In addition to the arrow P1 and the speed change display D, the information presentation unit 14 may display lines corresponding to the white lines L1 and L2 of the host-vehicle lane R1 on the display. The information presentation unit 14 may display icons corresponding to other vehicles in the vicinity of the host vehicle and the like on the display.

Figure 3:
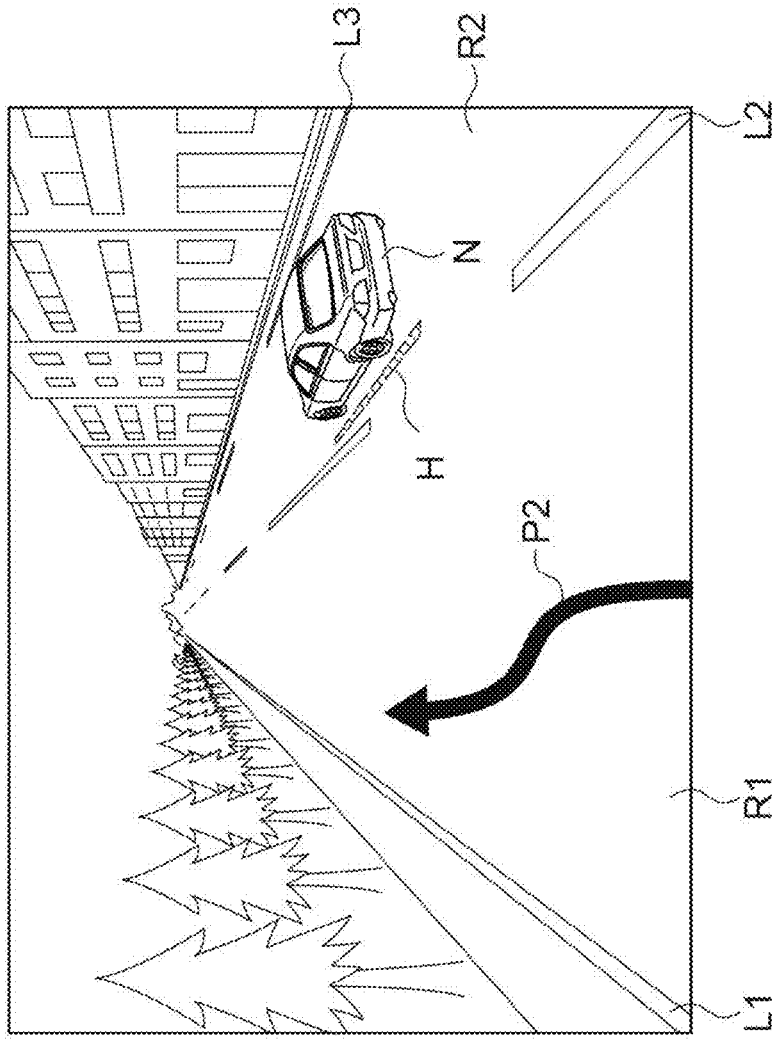
FIG. 3 is a diagram showing an example of information presentation when a decision is made to secure a lateral spacing with respect to an adjacent vehicle.

FIG. 3 is a diagram showing an example of information presentation when a decision is made to secure a lateral spacing with respect to an adjacent vehicle. The adjacent vehicle is another vehicle that is traveling in a lane adjacent to the host vehicle. FIG. 3 shows an adjacent vehicle N traveling in an adjacent lane R2, proximity display H indicating that the adjacent vehicle N is approaching the host-vehicle lane R1, and an arrow P2 indicating behavior for moving the host vehicle to the left as a change in the travel state of the host vehicle in order to secure a lateral distance from the adjacent vehicle N. In FIG. 3, the adjacent vehicle N is traveling in front of the host vehicle and is approaching the host-vehicle lane R1 side to make a lane change to the host-vehicle lane R1.

For example, when a decision of behavior for moving the host vehicle to the left has been made to secure the lateral spacing from the adjacent vehicle N as a decision to change the travel state of the host vehicle, the information presentation unit 14 presents the travel state change factor and change in the travel state of the host vehicle to the user by displaying the arrow P2 and the proximity display H as images as shown in FIG. 3.

In addition, the deceleration of the host vehicle due to the proximity between the preceding vehicle and the host vehicle may be a combination of the travel state change factor and the change in the travel state. In this case, the information presentation unit 14, for example, presents a short arrow indicating that an inter-vehicle distance between the preceding vehicle and the host vehicle is shortened as the travel state change factor and presents the deceleration of the host vehicle like the speed change display D of FIG. 2 as the change in the travel state. The color of the arrow in this case can be red. The color of the arrow P1 when the host vehicle is accelerated may be blue. Moreover, in this case, the speed change display D, for example, indicates that the vehicle speed of the host vehicle is reduced from 50 km/h to 25 km/h (or a speed identical to that of the preceding vehicle) by text. The speed change display D may be represented as an image.

In addition, the detection of a speed limit segment such as a school zone may be included as the travel state change factor of the deceleration of the host vehicle. In this case, the information presentation unit 14 may display a road sign or a road surface marking to be highlighted as the travel state change factor.

The information presentation unit 14 may adjust an amount of information presented to the user on the basis of a usage history of the automated driving control process recorded in the usage history database 5. The information presentation unit 14 may reduce the amount of information when the usage history of the automated driving control process for the host vehicle is a usage history of less than a certain period of time as compared with when the usage history is a usage history of a certain period of time or more. Reducing the amount of information means, for example, shortening the time of presentation, making a display image smaller, lightening the color of the image, and making the color of the image closer to black or white. Reducing the amount of information may include limiting the content of the speed change display D shown in FIG. 2 only to text indicating acceleration. The information presentation unit 14 may gradually reduce the amount of information as the usage history increases.

Reducing the amount of information includes omitting the presentation of the information itself for the user. For example, the information presentation unit 14 may perform the presentation of information for the user at the time of deceleration of the host vehicle for a traffic light displaying red light when the period of the usage history of the automated driving control process for the host vehicle is less than a certain period of time and may not perform the presentation when the period of the usage history of the automated driving control process for the host vehicle is the certain period of time or more. This is because when the travel state change factor is a traffic light with red light, it is easy for the user to understand the reason for the deceleration of the host vehicle.

When the user is performing personal authentication, the information presentation unit 14 may determine whether or not the period of the usage history is a certain period or more for each user. Moreover, the frequency or the number of presentations of information to the user for each travel state change factor may be recorded in the usage history.

When it is considered that the user can sufficiently understand the reason for the change in the travel state of the host vehicle decided by the machine learning model 13*a* (the travel state change factor), the information presentation unit 14 may not present information to the user in the travel state change factor.

The information presentation unit 14, for example, may determine that the user can sufficiently understand the travel state change factor when the number of presentations of information to the user for each travel state change factor is a certain value or more. Even if it is determined that the user can sufficiently understand the travel state change factor, the information presentation unit 14 may resume the presentation of information based on the travel state change factor a certain number of times when a predetermined period has elapsed from the last point in time when the information was presented to the user. By determining that the user is familiar with a road on which the host vehicle is currently traveling when the number of times the host vehicle passed through the road is the certain number of times or more in consideration of position information of the host vehicle, the information presentation unit 14 may not present information about a repeated travel state change factor on the road.

The information presentation unit 14 may not present information within a certain time from the previous presentation of information for the same travel state change factor.

The information presentation unit 14 can suppress an uncomfortable feeling for the user due to frequent presentation of information to the user according to the proximity between the preceding vehicle and the host vehicle, for example, when the host vehicle is in a traffic jam and the like.

When information about a position where the information has been presented to the user is included in the usage history, the information presentation unit 14 may increase an amount of information in a place where information is presented to the user for the first time as compared with another place where information is not presented to the user for the first time. Increasing the amount of information indicates, for example, lengthening the presentation time, enlarging the display image, darkening the color of the image, or making the color of the image closer to a prominent color (for example, red or the like). Increasing the amount of information may include increasing the amount of text in the speed change display D shown in FIG. 2 to provide detailed description.

Figure 4:
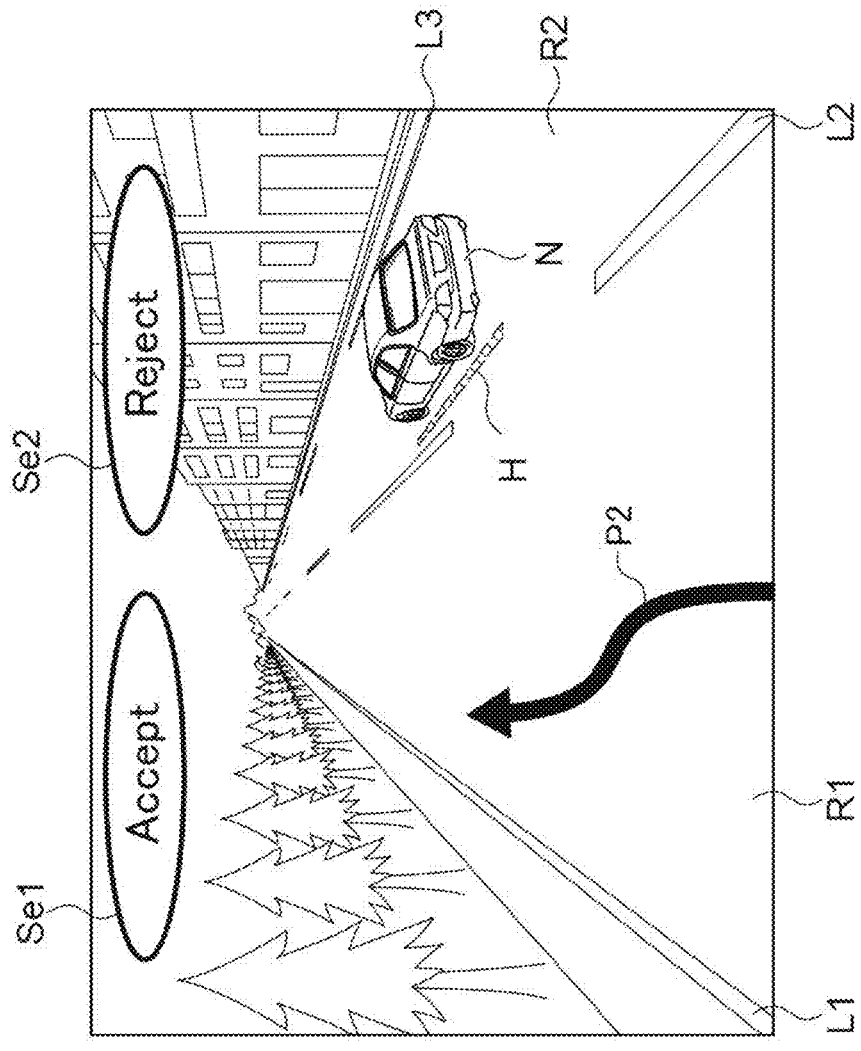
FIG. 4 is a diagram showing an example of feedback option display.

The information presentation unit 14 may require a feedback input from the user when information is presented to the user. Here, FIG. 4 is a diagram showing an example of feedback option display. In FIG. 4, Accept display Se1 and Reject display Se2 are shown. The display in FIG. 4 is assumed to be a touch panel. The user can provide feedback for the presentation of information by touching the Accept display Se1 or the Reject display Se2.

In addition, the information presentation unit 14 does not necessarily need to ask the user for feedback every time. The information presentation unit 14 may require feedback at a certain frequency or every time a certain period of time has passed. Moreover, the information presentation unit 14 may not require feedback when presenting information about the same travel state change factor within a certain period of time.

The feedback reception unit 15 receives the user's feedback for the presentation of information. The feedback may be a physical button input instead of the touch panel input shown in FIG. 4, or it may be an audio input. The feedback reception unit 15 maintains current settings for the presentation of information when the user selects Accept.

The feedback reception unit 15 may adjust the amount of information on the basis of the user's feedback. When the user has input Reject, the feedback reception unit 15 may display a parameter adjustment screen for the user to adjust the presence or absence of presentation of information for a current travel state change factor, a timing of the presentation of the information, an amount of information, and the like.

The feedback reception unit 15 may adjust the timing of the change in the travel state of the host vehicle in the automated driving control or the amount of control of the change in the travel state of the host vehicle on the basis of the user's feedback. After the information is presented and the feedback options are displayed, the feedback reception unit 15 may adjust the timing of the change in the travel state of the host vehicle based on a relationship between a timing when the host vehicle actually changes the travel state and a timing when the user inputs the feedback of Reject.

For example, when a timing when the user inputs the feedback of Reject is earlier than a timing when the host vehicle changes the travel state by a certain time or more, the feedback reception unit 15 makes an adjustment so that the timing of the change in the travel state of the host vehicle in the current travel state change factor is advanced. When the timing when the user inputs the feedback of Reject is later than the timing when the host vehicle changes the travel state by the certain time or more, the feedback reception unit 15 makes an adjustment so that the timing of the change in the travel state of the host vehicle in the current travel state change factor is delayed. Thereby, the change in the travel state in the automated driving control process can be adapted to the user's senses.

Moreover, the feedback reception unit 15 may adjust the amount of control of the automated driving control process to slow down the deceleration when the user inputs the feedback of Reject at the time of deceleration of the host vehicle. The same is also true for the case of acceleration of the host vehicle and a change in the route of the host vehicle (a change in the steering angle).

The feedback reception unit 15 may perform scene analysis on the basis of the user's feedback, the external environment of the host vehicle, and the travel state, classify whether the scene relates to any one of safety, easy mind, and comfort, and prevent the presentation of information for a scene linked to safety as a risk scene from being turned off. Because what is classified as easy mind or comfort depends on the user's preference, the feedback reception unit 15 adjusts a timing and/or an amount of control of a change in the travel state so that the features or functionality of a system are adjusted to meet the preferences or needs of the user and the number of inputs of Accept of the user increases. In addition, the feedback reception unit 15 ends the reception of feedback when the user does not perform any input for a certain period of time even if the feedback options are displayed.

Method of Controlling Automated Driving System

Figure 5:
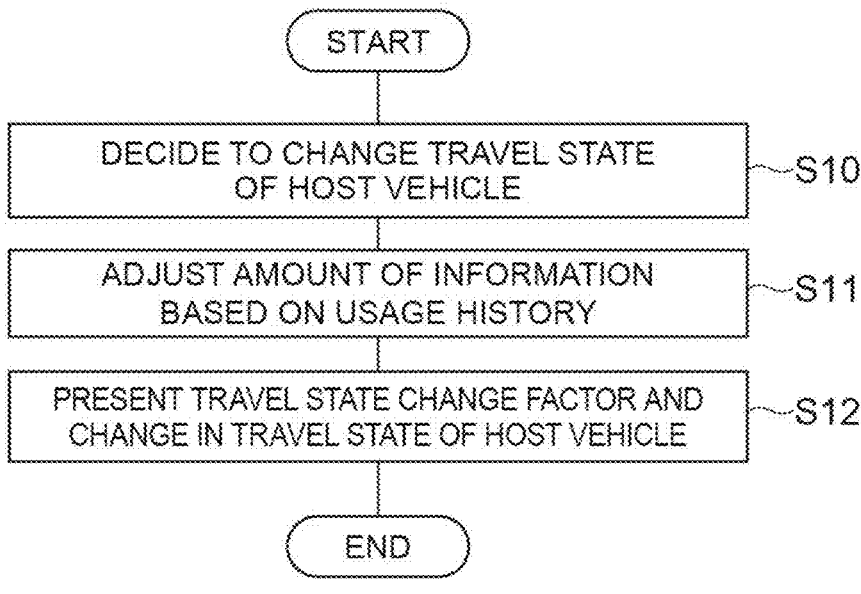
FIG. 5 is a flowchart showing an example of an information presentation process.

Next, a control method of the automated driving system 100 according to the present embodiment will be described with reference to the drawings. FIG. 5 is a flowchart showing an example of the information presentation process. The information presentation process is performed, for example, when the automated driving ECU 10 decides to change the travel state of the host vehicle serving as a predetermined information presentation target.

As shown in FIG. 5, the automated driving ECU 10 of the automated driving system 100 decides to change the travel state of the host vehicle using the machine learning model 13*a* with the automated driving control unit 13 in S10. On the basis of a target route, position information of the host vehicle, and map information, or a detection result of the external sensor 2 of the host vehicle, the automated driving control unit 13 decides to change the travel state of the host vehicle in an automated driving control process based on the machine learning model 13*a*. Thereafter, the automated driving ECU 10 moves to S11.

In S11, the automated driving ECU 10 adjusts the amount of information based on the user's usage history with the information presentation unit 14. On the basis of the usage history recorded in the usage history database 5, the information presentation unit 14 recognizes the usage history related to the change in the current travel state and adjusts the amount of information to be presented to the user. Thereafter, the automated driving ECU 10 moves to the S12.

In S12, the automated driving ECU 10 presents a travel state change factor and a change in the travel state of the host vehicle with the information presentation unit 14. As shown in FIGS. 2 and 3, for example, the information presentation unit 14 presents the travel state change factor and the change in the travel state of the host vehicle to the user. Thereafter, the automated driving ECU 10 ends the current information presentation process.

Figure 6:
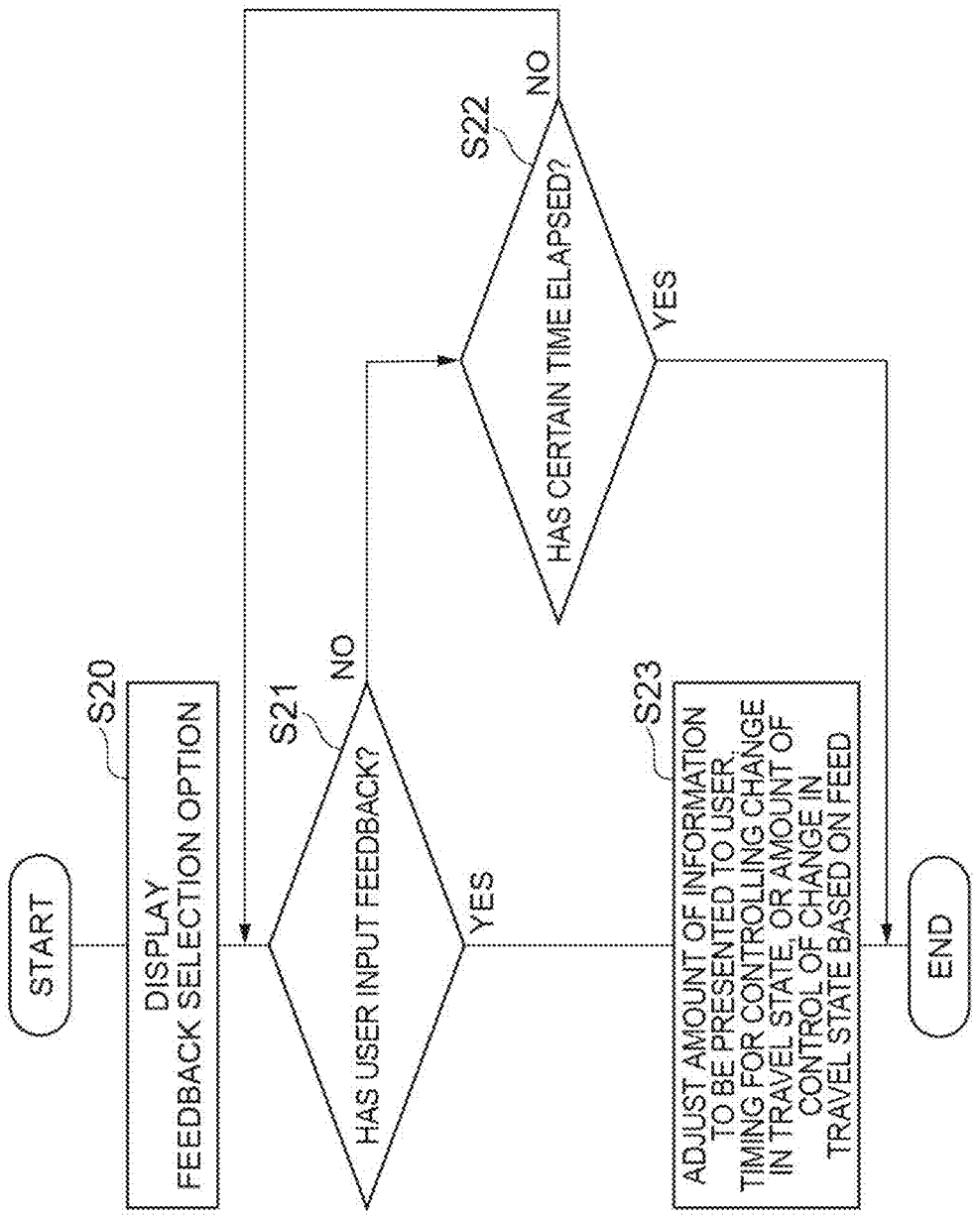
FIG. 6 is a flowchart showing an example of a feedback process.

FIG. 6 is a flowchart showing an example of a feedback process. The feedback process is executed when information is presented in S12 of FIG. 5. In addition, the feedback process may be executed only when a predetermined condition is satisfied to prevent the user from feeling troublesome. The predetermined condition, for example, can be that no feedback has been input for the same travel state change factor during a certain period.

As shown in FIG. 6, the automated driving ECU 10 displays feedback options with the information presentation unit 14 in S20. The information presentation unit 14 shows, for example, the Accept display Se1 and the Reject display Se2 shown in FIG. 4. Thereafter, the automated driving ECU 10 moves to the S21.

In S21, the automated driving ECU 10 determines whether or not the user has input feedback through the feedback reception unit 15. When it is determined that the user has not input feedback (S21: NO), the automated driving ECU 10 moves to S22. When it is determined that the user has input feedback (S21: YES), the automated driving ECU 10 moves to S23.

In S22, the automated driving ECU 10 determines whether or not a certain time has elapsed after the feedback option was displayed. When the automated driving ECU 10 determines that the certain time has not elapsed (S22: NO), the automated driving ECU 10 returns to S21 and iterates the determination. When it is determined that the certain time has elapsed (S22: YES), the automated driving ECU 10 ends the current feedback process.

In S23, the automated driving ECU 10 adjusts the amount of information, the timing of the change in the travel state of the host vehicle, or the amount of control of the change in the travel state of the host vehicle with the feedback reception unit 15. The feedback reception unit 15 adjusts various types of parameters so that the parameters are suitable for the user's senses.

The automated driving system 100 according to the present embodiment described above can present the travel state change factor and the change in the travel state to the user when the change in the travel state of the automated driving control process based on the machine learning model 13*a* is decided (see FIG. 2).

Moreover, the automated driving system 100 can present the proximity of an adjacent vehicle N to the host-vehicle lane R1 side and the change in the travel position within the host-vehicle lane R1 to the user when the machine learning model 13*a* causes the travel position within the host-vehicle lane R1 to move to a position away from the adjacent lane R2 due to the proximity of the adjacent vehicle M to the host-vehicle side in the situation shown in FIG. 3.

Moreover, according to the automated driving system 100, because the presentation of the travel state change factor may be troublesome for a user who is familiar therewith, the amount of information to be presented to the user can be adjusted on the basis of the usage history of the automated driving control process for the host vehicle (or the usage history of the automated driving control process for each user), such that it is possible to suppress an uncomfortable feeling for the user due to presentation.

Furthermore, according to the automated driving system 100, automated driving suitable for the user's senses can be performed by adjusting the timing of the change in the travel state of the host vehicle or the amount of control of the change in the travel state of the host vehicle on the basis of a feedback result from the user.

Although embodiments of the present disclosure have been described above, the present disclosure is not limited to the above-described embodiments. The present disclosure can be implemented in various forms in which various changes and improvements are made on the basis of the knowledge of those skilled in the art as well as the above-described embodiments.

The automated driving system 100 does not necessarily need to receive the user's feedback. The automated driving ECU 10 does not need to have the feedback reception unit 15. The automated driving system 100 does not necessarily need to use the usage history of the automated driving control. The automated driving ECU 10 does not need to be connected to the usage history database 5.

What is claimed is:

1. An automated driving system for deciding to change a travel state of a host vehicle using a machine learning model in an automated driving control process for the host vehicle, the automated driving system comprising:

an automated driving control unit configured to decide to change the travel state of the host vehicle using the machine learning model on a basis of a preset target route and position information of the host vehicle and map information, or a detection result of an external sensor of the host vehicle, and configured to operate the host vehicle based on the change in the travel state of the host vehicle;

an information presentation unit configured to present a travel state change factor, which is a main cause of the change in the travel state, and the change in the travel state of the host vehicle to a user of the host vehicle when the automated driving control unit decides to change the travel state of the host vehicle; and a feedback reception unit configured to receive feedback from the user corresponding to the presentation of the travel state change factor and the change in the travel state of the host vehicle by the information presentation unit for the user, wherein the automated driving control unit is configured to adjust at least one of a timing of the change in the travel state of the host vehicle and an amount of control of the change in the travel state of the host vehicle on a basis of a result of the feedback, wherein the information presentation unit is configured to adjust an amount of information to be presented to the user on a basis of a usage history of the automated driving control process for the host vehicle.

2. The automated driving system according to claim 1, wherein the travel state change factor includes proximity of another vehicle, which is traveling in front of the host vehicle and in a lane adjacent to the host vehicle, to a host-vehicle lane side on which the host vehicle is traveling, and wherein the change in the travel state includes changing a travel position within a host-vehicle lane of the host vehicle to a position away from an adjacent lane.

3. The automated driving system according to claim 2, wherein the information presentation unit is configured to adjust an amount of information to be presented to the user on a basis of a usage history of the automated driving control process for the host vehicle.

4. A control method for an automated driving system for deciding to change a travel state of a host vehicle using a machine learning model in an automated driving control process for the host vehicle, the control method comprising:

deciding to change the travel state of the host vehicle using the machine learning model on a basis of a preset target route and position information of the host vehicle and map information, or a detection result of an external sensor of the host vehicle; and presenting a travel state change factor, which is a main cause of the change in the travel state, and the change in the travel state of the host vehicle to a user of the host vehicle before the change in the travel state when the change in the travel state of the host vehicle is decided;

adjusting an amount of information to be presented to the user on a basis of a usage history of the automated driving control process for the host vehicle;

receiving feedback from the user corresponding to the presentation of the travel state change factor and the change in the travel state of the host vehicle;

adjusting at least one of a timing of the change in the travel state of the host vehicle and an amount of control of the change in the travel state of the host vehicle on a basis of a result of the feedback; and operating the host vehicle based on the change in the travel state of the host vehicle.

5. The automated driving system according to claim 1, wherein the automated driving control unit is configured to adjust the timing of the change in the travel state of the host vehicle on a basis of a relationship between a timing when the host vehicle actually changes the travel state and a timing when the user inputs the feedback of reject.

6. The control method according to claim 4, wherein the adjusting the timing includes adjusting the timing of the change in the travel state of the host vehicle on a basis of a relationship between a timing when the host vehicle actually changes the travel state and a timing when the user inputs the feedback of reject.

* * * * *